(12) United States Patent
Corry et al.

(10) Patent No.: US 12,469,950 B2
(45) Date of Patent: Nov. 11, 2025

(54) UNIVERSAL RADIO INTERFACE

(71) Applicant: Unmanned Systems and Solutions LLC, Tampa, FL (US)

(72) Inventors: Paul Corry, Oakville (CA); Stephen McKenna, Burr Ridge, IL (US)

(73) Assignee: Unmanned Systems and Solutions LLC, Tampa, FL (US)

( * ) Notice: Subject to any disclaimer, the term of this patent is extended or adjusted under 35 U.S.C. 154(b) by 198 days.

(21) Appl. No.: 18/153,138

(22) Filed: Jan. 11, 2023

(65) Prior Publication Data
US 2023/0223703 A1  Jul. 13, 2023

Related U.S. Application Data

(60) Provisional application No. 63/298,687, filed on Jan. 12, 2022.

(51) Int. Cl.
| | | |
|---|---|---|
| *H01Q 13/18* | (2006.01) |
| *H01Q 1/12* | (2006.01) |
| *H01Q 1/28* | (2006.01) |
| *H01Q 9/32* | (2006.01) |
| *H01Q 21/06* | (2006.01) |
| *H04B 1/08* | (2006.01) |

(52) U.S. Cl.
CPC .............. *H01Q 1/12* (2013.01); *H01Q 1/28* (2013.01); *H01Q 9/32* (2013.01); *H01Q 13/18* (2013.01); *H01Q 21/061* (2013.01); *H04B 1/082* (2013.01)

(58) Field of Classification Search
CPC .. H01Q 1/12; H01Q 1/28; H01Q 9/32; H01Q 13/18; H01Q 21/061; H04B 1/082
See application file for complete search history.

(56) References Cited

U.S. PATENT DOCUMENTS

| | | | | |
|---|---|---|---|---|
| 3,906,371 A | * | 9/1975 | Tsuji ..................... | H04B 1/082 |
| | | | | 361/814 |
| 4,005,367 A | * | 1/1977 | Dano ..................... | H04B 1/082 |
| | | | | 455/90.3 |
| 4,313,584 A | * | 2/1982 | Fukunaga .............. | B60K 35/00 |
| | | | | 248/27.3 |
| 4,462,564 A | * | 7/1984 | Alves ..................... | G12B 9/00 |
| | | | | 455/345 |
| 4,756,495 A | * | 7/1988 | Putnam .................. | B60K 35/50 |
| | | | | 439/298 |

(Continued)

Primary Examiner — Ryan J. Walters
(74) Attorney, Agent, or Firm — Jeffrey B. Fabian; Shumaker, Loop & Kendrick, LLP

(57) ABSTRACT

Disclosed is an universal radio interface system that allows different types of radios to be installed on a mobile or stationary platform. After a radio is installed, the radio can be efficiently removed and replaced with a different type of radio without having to change cabling, connectors, or mounting hardware. The universal radio interface can include an universal interface housing that can be mounted to the mobile or stationary platform. The universal radio interface also includes a radio tray that is installed in the universal interface housing. The radio tray is configured to accommodate specific types or sizes of radio modules. The universal radio interface system can also include a radio tray backing affixed to the radio tray and the radio module. The radio module, radio tray, and radio tray backing are assembled and secured within an interior cavity of the universal interface housing.

2 Claims, 14 Drawing Sheets

(56) References Cited

U.S. PATENT DOCUMENTS 4,868,715 A * 9/1989 Putman ............... B60R 11/0205
                                                                  361/810
5,104,071 A * 4/1992 Kowalski ............ B60R 11/0205
                                                                  455/345

\* cited by examiner

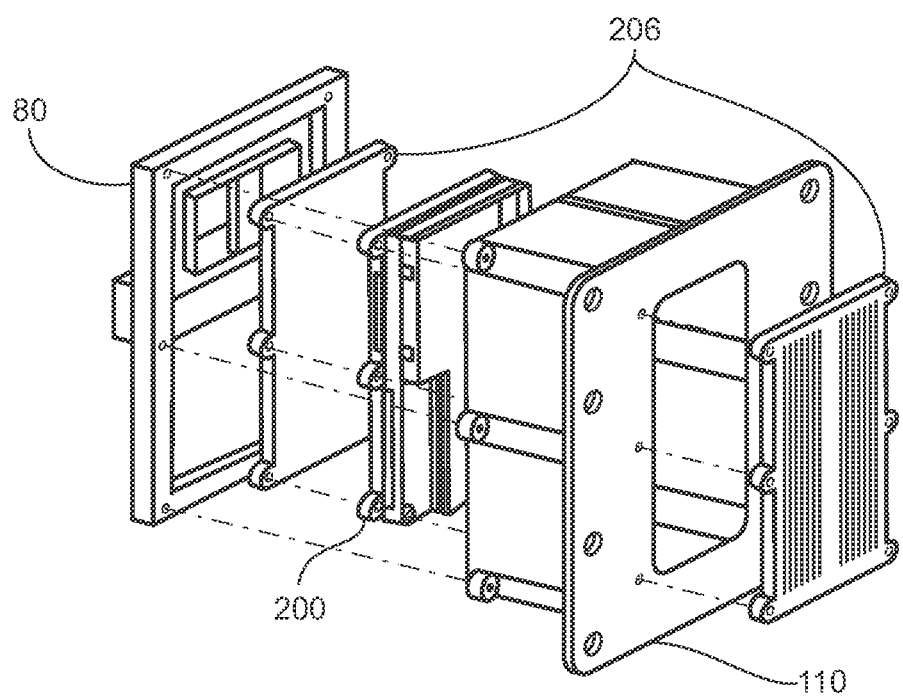
FIG. 8
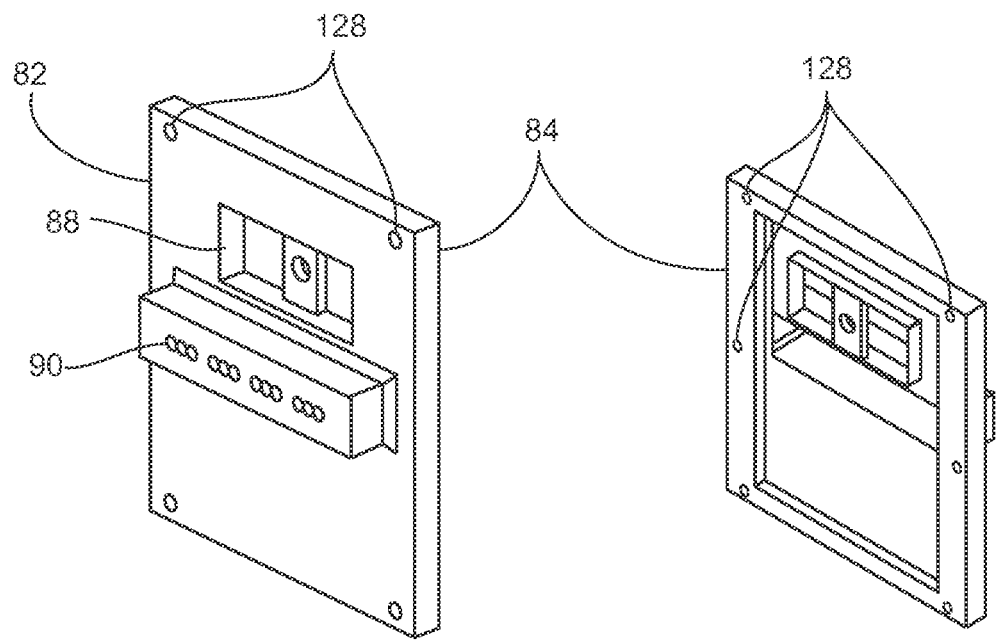
FIG. 9A
FIG. 9B

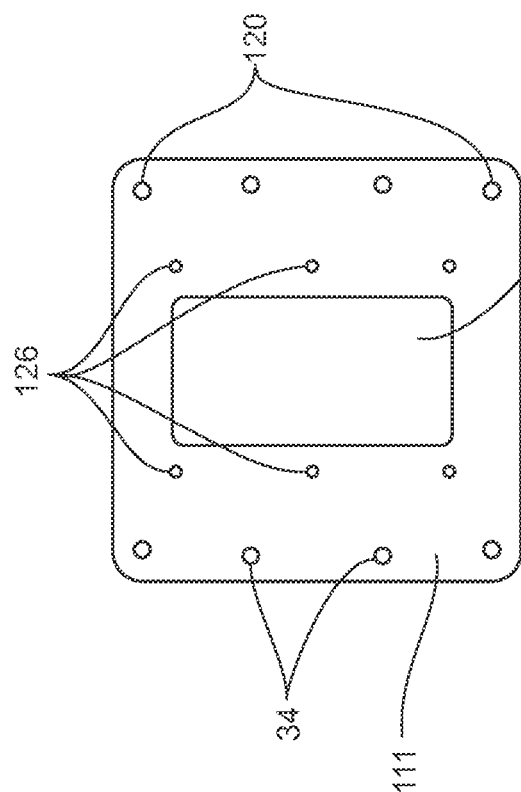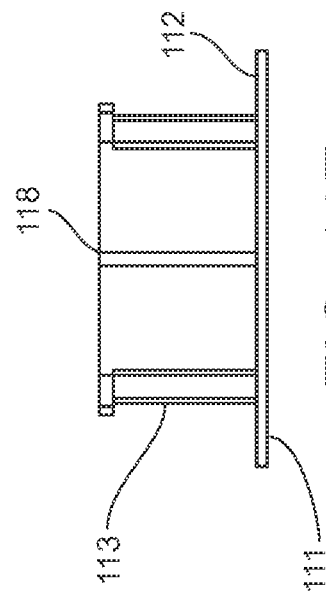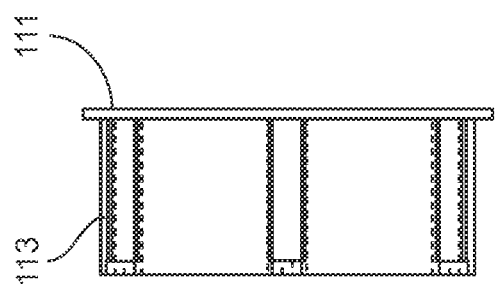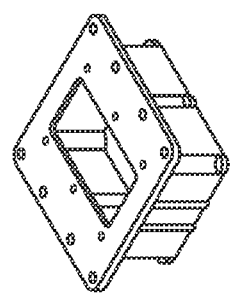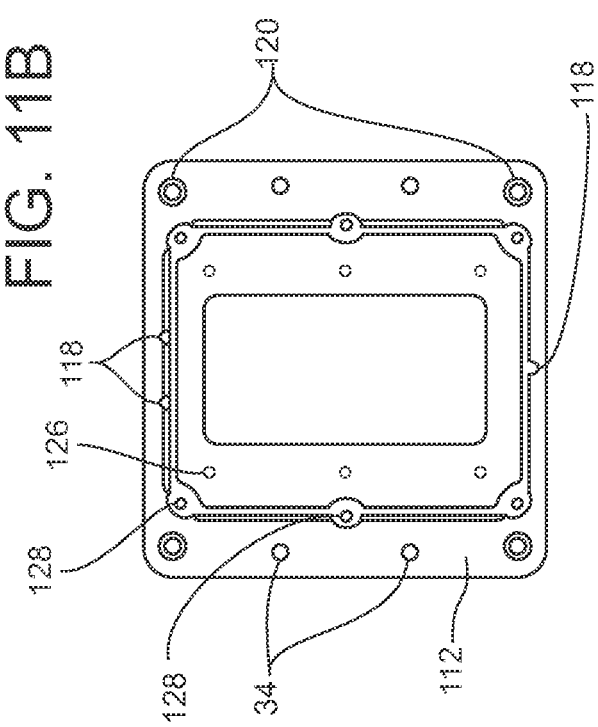

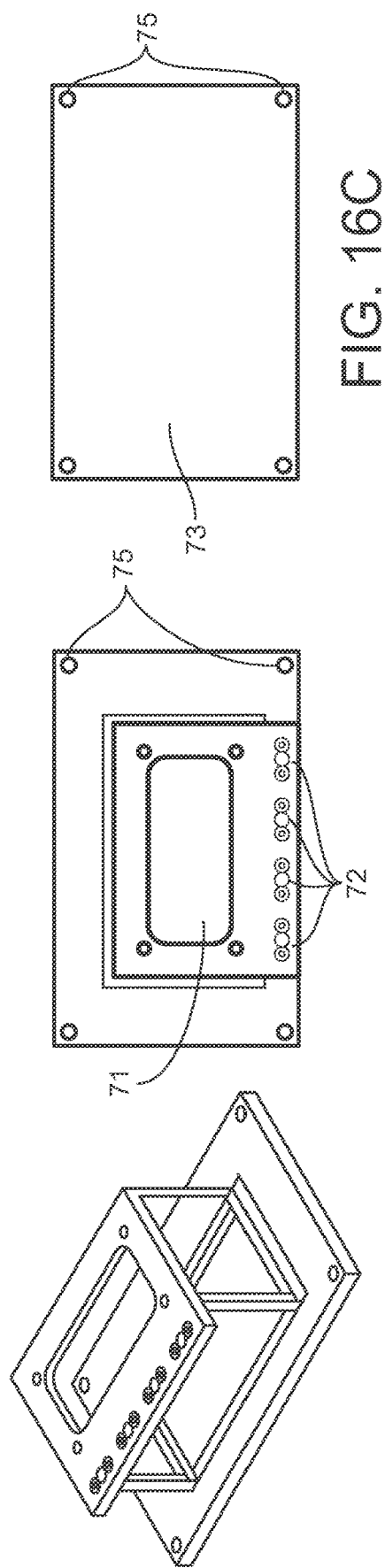
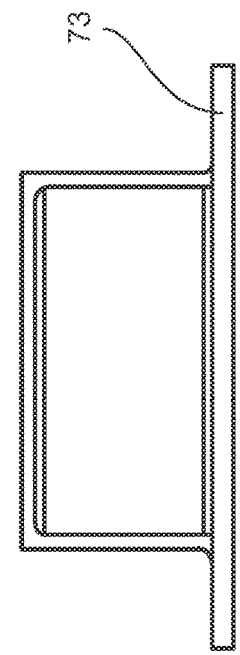
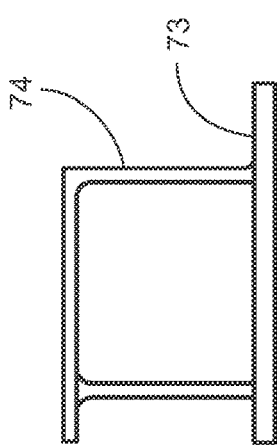
FIG. 16A
FIG. 16B
FIG. 16C
FIG. 16D
FIG. 16E

UNIVERSAL RADIO INTERFACE

TECHNICAL FIELD AND BACKGROUND

The present invention relates generally to radio interfaces, and more particularly, to a universal radio interface that permits various types of radios to be mounted to a vehicle or other mobile platform.

Tactical and other types of radios are commonly used for field applications when cellular, wired, or other types of network connections are not available. Tactical radios can provide push-to-talk communications as well as data transmission and networking capabilities. In part because radios transmit over limited distances, it can be advantageous to mount radios to a mobile platform to transport the radios from location to location and to permit the use of larger power sources and longer antennas that improve signal transmission. Examples include mounting radios to a car, truck, watercraft, airplane, unmanned aerial vehicle ("UAV"), or a backpack carried by an individual.

Radios vary significantly in performance characteristics and form factors to accommodate different use cases and depending on the manufacturer. The type of radio selected for a given application depends on factors that include the desired transmission distance, the number of users on a network, desired data transmission speeds, bandwidth requirements, and the mobile platform used to transport the radio, among other factors. In some cases, multiple types of radios must be used at the same time, or radios must be swapped out between uses to accommodate different use cases.

Using multiple types of radios presents significant challenges particularly when the radios must interfaced with a mobile platform. Mobility and power requirements limit the number of radios that can be mounted to a mobile platform, such as a UAV where space is limited and additional weight impedes flight performance.

Swapping radios between applications is often impractical owing to the fact that radios have different connectors and form factors depending on the manufacturer or type of radio. For instance, radios may require a different number of antennas, distinct mounting configurations (e.g., varying fastener configurations or brackets), or varying data connectors and cabling (e.g., Ethernet, rounded, or DB9 pin connectors). Switching radios between applications, therefore, requires not only replacing the radio unit itself but also replacing the mounting hardware as well as the data and antenna connectors and cables.

To address the challenges observed with conventional mobile radio systems, it is an object of the present invention to provide novel universal radio interfaces that allow mobile platforms to accommodate different types of radios that can be efficiently swapped out depending on the desired application or radio manufacturer.

SUMMARY

Disclosed herein is a universal radio interface system for mounting a radio to a communication platform. The communication platform itself can be mounted to a stationary platform, such as a ground station, or to a mobile platform, such as an unmanned aerial vehicle or automobile. The system includes a radio module and a radio tray. The radio tray includes an exterior face, an interior face, a tray opening that extends between the exterior face and the interior face, and one or more tray casing sidewalls extending outward from the interior face. The tray casing sidewalls define an interior void. The tray opening and the interior void are sized to accommodate the radio module. The radio module is couple to the radio tray and seated at least partially within the tray opening and interior void.

The system further includes an universal interface housing that has an interior cavity, one or more guide ports that extend from an exterior of the universal interface housing to the interior cavity, and a mounting surface coupled to the communication platform. The guide ports can be sized to accommodate cabling that connects the radio module to the communication platform. The cabling can be antenna cabling, power cabling, or data cabling, among other types of cables. The interior cavity sized to accommodate the tray casing sidewalls. The radio tray is coupled to the universal interface housing and the tray casing sidewalls are seated at least partially within the interior cavity.

In one embodiment, the universal radio interface system includes an elongated tooth formed on an exterior surface of the tray casing sidewalls. The tooth fits within an elongated radio tray guide formed as a groove on a surface of the interior cavity when the radio tray is coupled to the universal interface housing. Fitting the tooth within the radio tray guide helps to stabilize the radio tray within the universal interface housing.

The system can also include a radio tray backing coupled to the tray casing sidewalls and seated within the interior cavity of the universal interface housing. The universal interface housing can be formed with an universal backing tray access that extends from the exterior of the universal interface housing through a sidewall of the housing to the interior cavity. The universal backing tray is coupled to the universal interface housing and seated at least partially within the universal backing tray access. The universal backing tray has a mounting plate affixed to the universal interface housing, a spacer extending from the mounting plate into the interior cavity, and a universal backing tray face coupled to the spacer and frictionally engaged with the radio tray backing.

In yet another embodiment, the radio tray backing has at least one antenna port sized to accommodate antenna cabling that connects to the radio module and to the communication platform. In that embodiment, the universal backing tray face has at least one antenna connection point extending through the universal backing tray face. When the universal backing tray face is frictionally engaged with the radio tray backing, the antenna port of the radio tray backing is aligned with the antenna connection point of the universal backing tray face. This allows cable to be fed through the universal radio interface system from the radio module to the communication platform.

The radio tray backing comprises at least one a universal connector slot sized to accommodate additional cabling (besides the antenna cabling) that connects the radio module to the communication platform. In that case, the universal backing tray face has at least one universal connection point extending through the universal backing tray face. When the universal backing tray face is frictionally engaged with the radio tray backing, the at least one universal connector slot of the radio tray backing is aligned with the at least one universal connection point of the universal backing tray face.

BRIEF DESCRIPTION OF THE DRAWINGS

Features, aspects, and advantages of the present invention are better understood when the following detailed description of the invention is read with reference to the accompanying drawings, in which:

FIG. 8 is an exploded view of a tactical radio, a radio tray, and a radio tray backing according to one embodiment.

FIG. 9A is an isometric view of one embodiment of a radio tray backing.

FIG. 9B is an isometric view of one embodiment of a radio tray backing.

FIG. 11A is a top, isometric view of a second embodiment of a radio tray.

FIG. 11B is a side view of a second embodiment of a radio tray.

FIG. 11C is a front view of a second embodiment of a radio tray.

FIG. 11D is a rear view of a second embodiment of a radio tray.

FIG. 11E is a bottom view of a second embodiment of a radio tray.

FIG. 16A is an isometric view of an universal backing tray according to one embodiment.

FIG. 16B is front view of an universal backing tray according to one embodiment.

FIG. 16C is rear view of an universal backing tray according to one embodiment.

FIG. 16D is a side view of an universal backing tray according to one embodiment.

FIG. 16E is a bottom view of an universal backing tray according to one embodiment.

DETAILED DESCRIPTION

Figure 1:
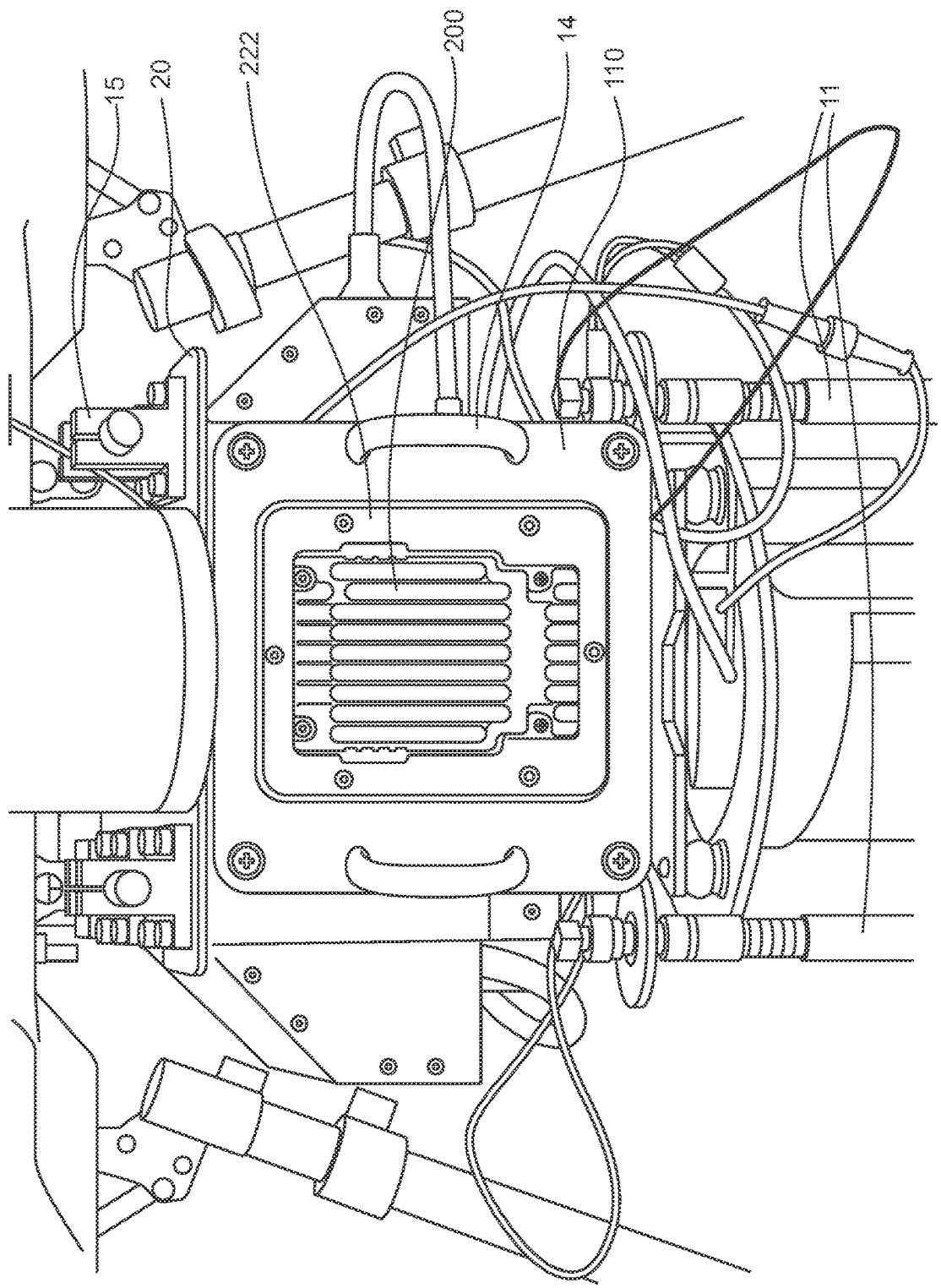
FIG. 1 illustrates an embodiment of a tactical radio interface payload mounted on an unmanned aerial vehicle.

The present invention will now be described more fully hereinafter with reference to the accompanying figures in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

Relative terms such as lower or bottom; upper or top; upward, outward, or downward; forward or backward; and vertical or horizontal may be used herein to describe one element's relationship to another element illustrated in the figures. It will be understood that relative terms are intended to encompass different orientations in addition to the orientation depicted in the drawings. By way of example, if a component in the drawings is turned over, elements described as being on the "bottom" of the other elements would then be oriented on "top" of the other elements. Relative terminology, such as "substantially" or "about," describe the specified materials, steps, parameters, or ranges as well as those that do not materially affect the basic and novel characteristics of the claimed inventions as whole, as would be appreciated by one of ordinary skill in the art.

Disclosed is an universal radio interface system that allows different types of radios to be installed on a mobile platform. After a radio is installed, the radio can be efficiently removed and replaced with a different type of radio without having to change cabling, connectors, or mounting hardware. Eliminating the need to change cabling and connectors allows the cables and connectors to be designed prior to radio installation to optimize signal propagation regardless of the type of radio that is installed. For instance, in a multi-antenna system, each of the cables leading to an antenna can be designed to be the same length with the same number of connectors so that the resistance and other electrical properties are the same across each antenna cable. This in turn helps ensure uniform signal quality for each antenna. Additionally, the number of connectors can be minimized to mitigate the signal loss that occurs across a connector.

Figure 2:
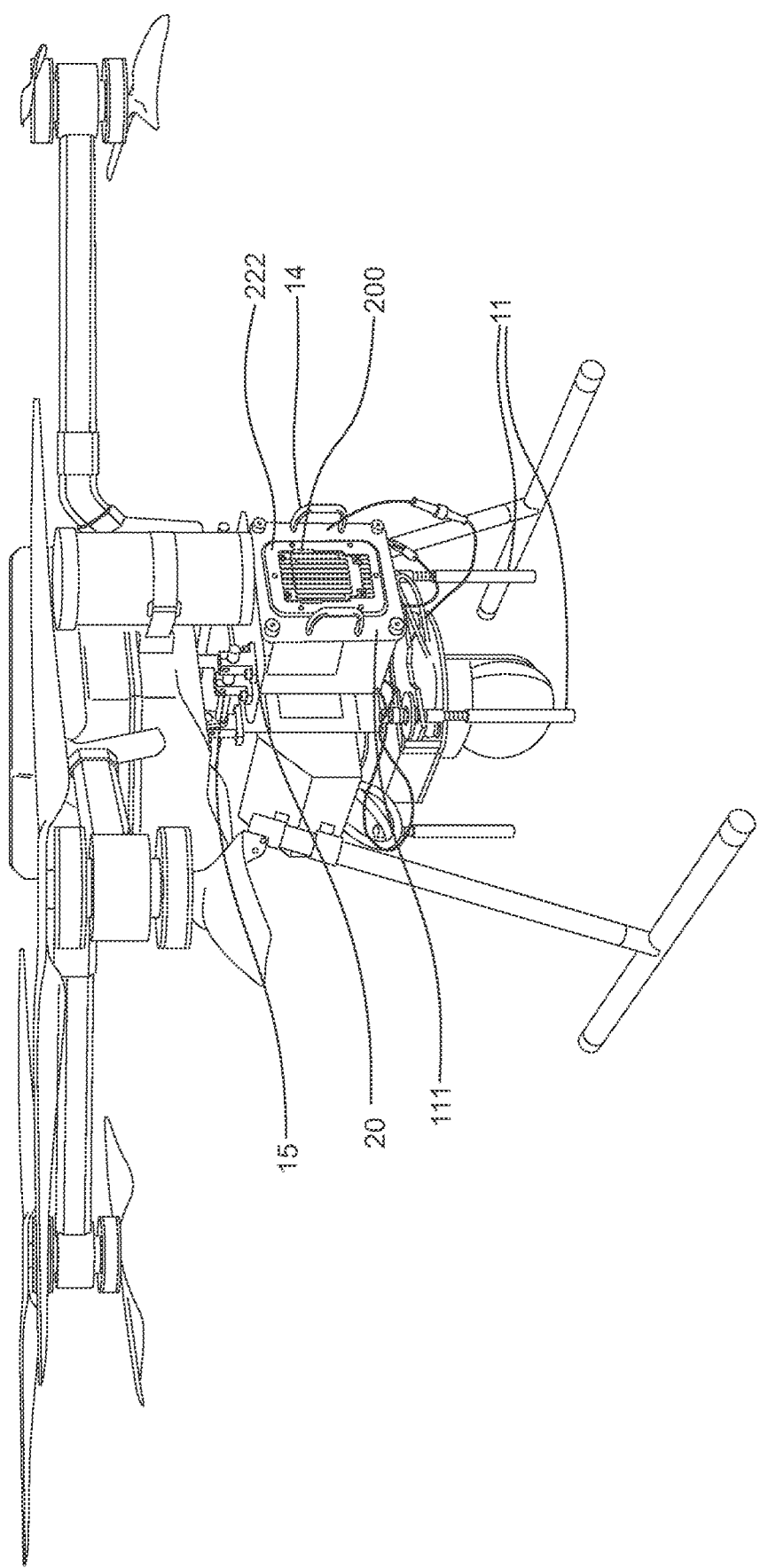
FIG. 2 illustrates an embodiment of a tactical radio interface payload mounted on an unmanned aerial vehicle.

The present universal radio interface system finds particular applicability to installing tactical radios on UAVs, as illustrated in FIGS. 1 and 2. However, those of ordinary skill in the art will appreciate that the interface systems can be used to install various types of radios in both non-mobile and a variety of mobile platforms, such as automobiles (e.g., cars, trucks), watercraft (e.g., boats, ships), hand carts, or backpacks, among others.

Figure 3:
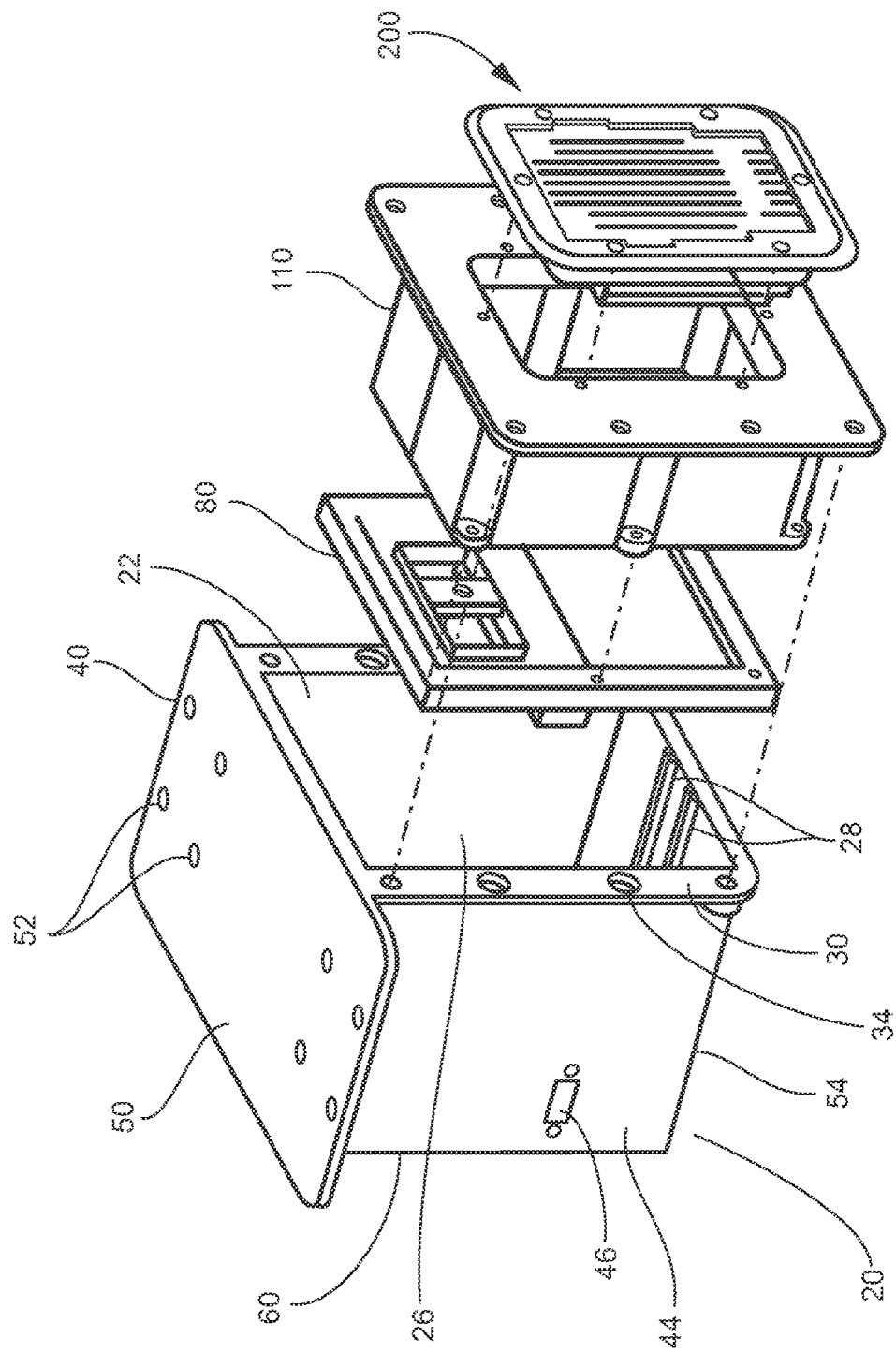
FIG. 3 is an exploded view of a tactical radio interface according to one embodiment.
Figure 4:
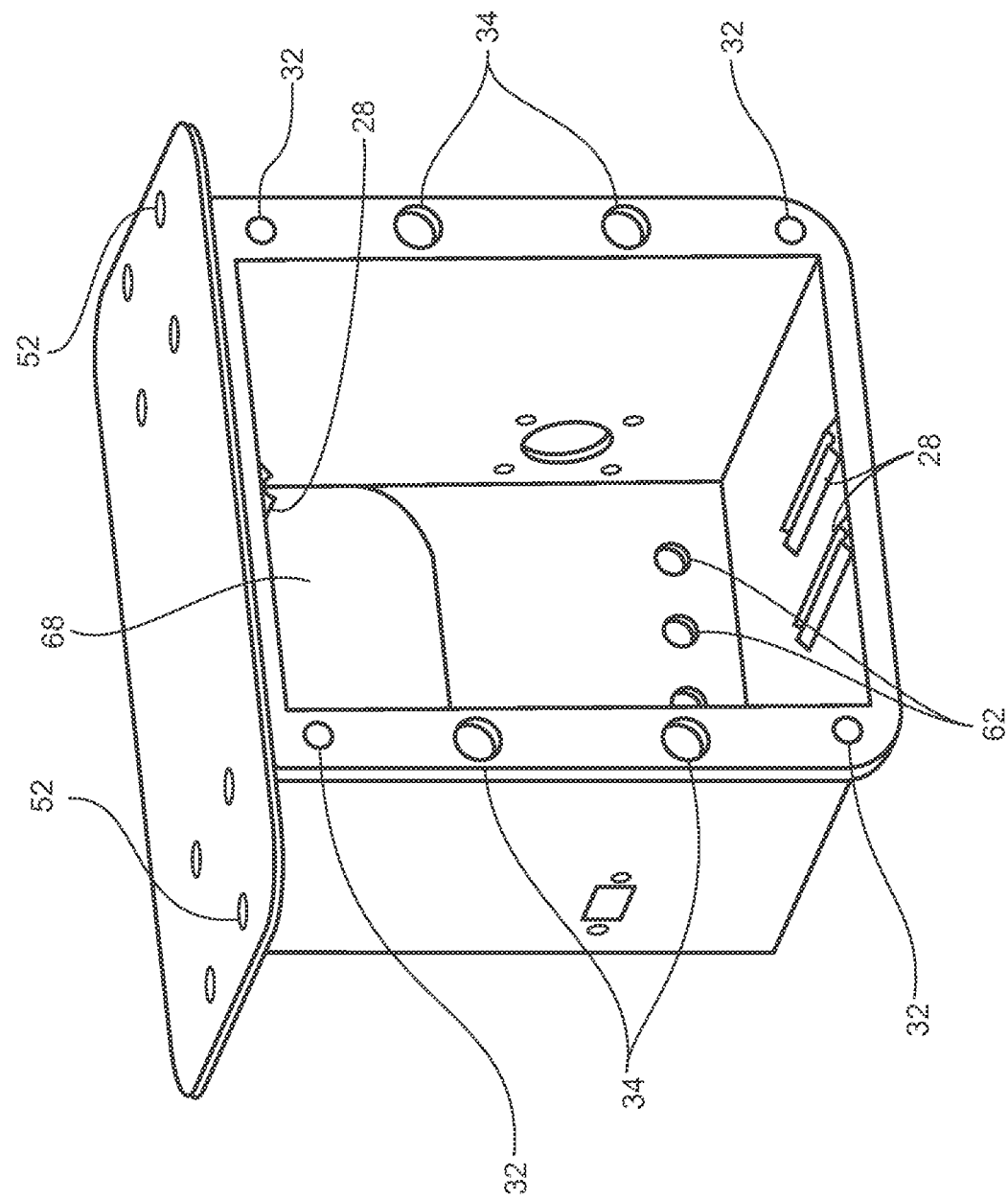
FIG. 4 is a perspective view of an universal interface housing according to one embodiment.
Figure 5B:
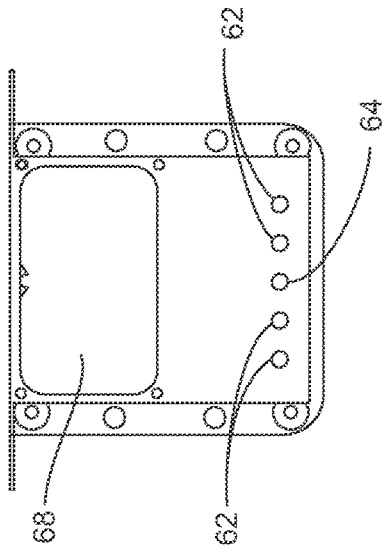
FIG. 5B is a front view of an universal interface housing according to one embodiment.
Figure 5D:
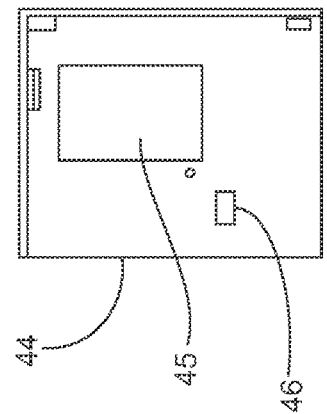
FIG. 5D is a second side view of an universal interface housing according to one embodiment.
Figure 5A:
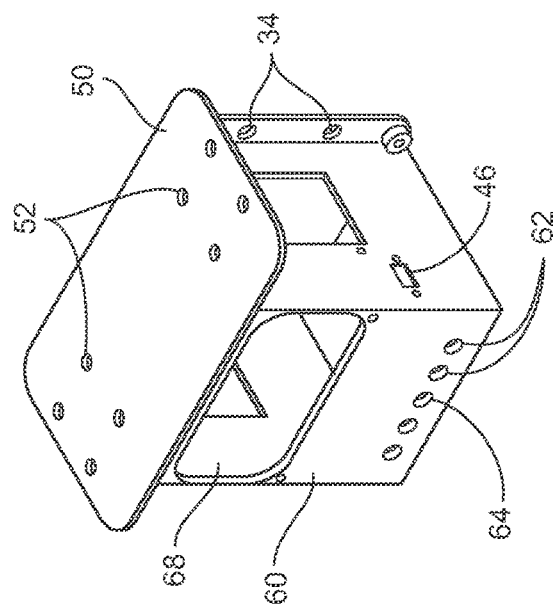
FIG. 5A is an isometric view of an universal interface housing according to one embodiment.
Figure 5C:
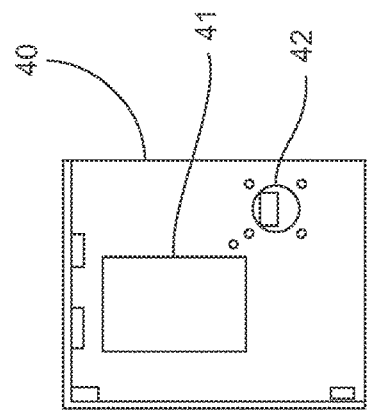
FIG. 5C is a first side view of an universal interface housing according to one embodiment.
Figure 6B:
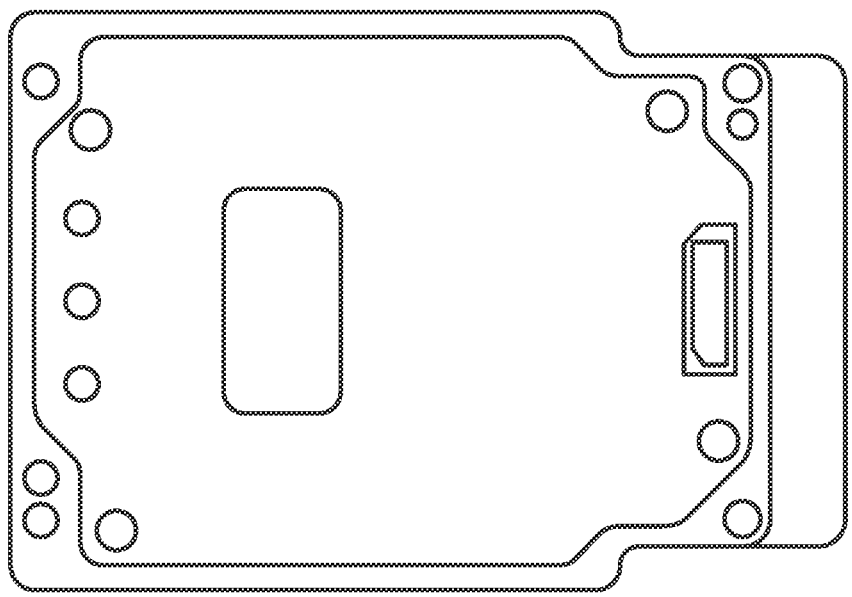
FIG. 6B shows a second side of an example radio module.
Figure 6A:
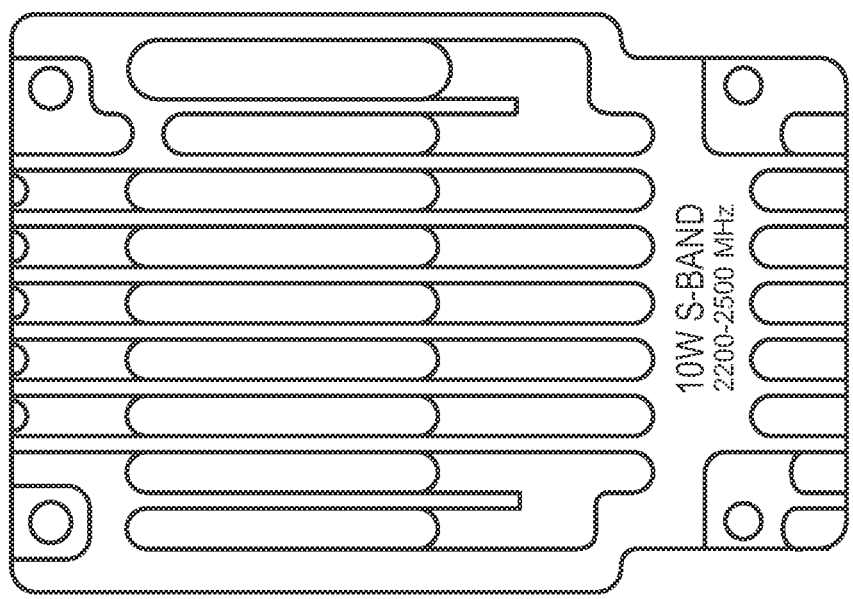
FIG. 6A shows a first side of an example radio module.
Figure 10A:
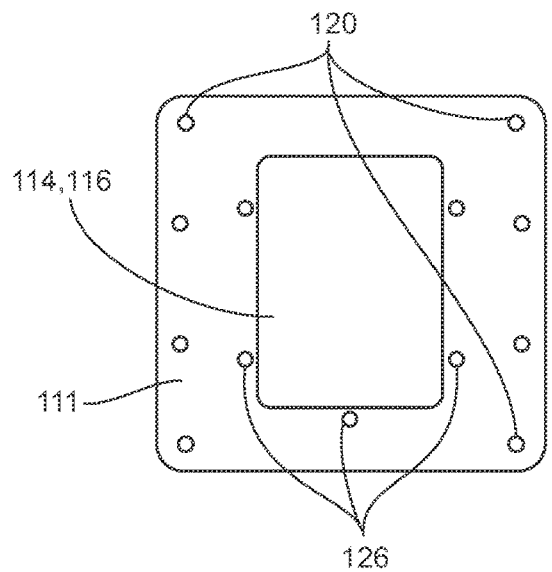
FIG. 10A is a front view of a first embodiment of a radio tray.
Figure 10B:
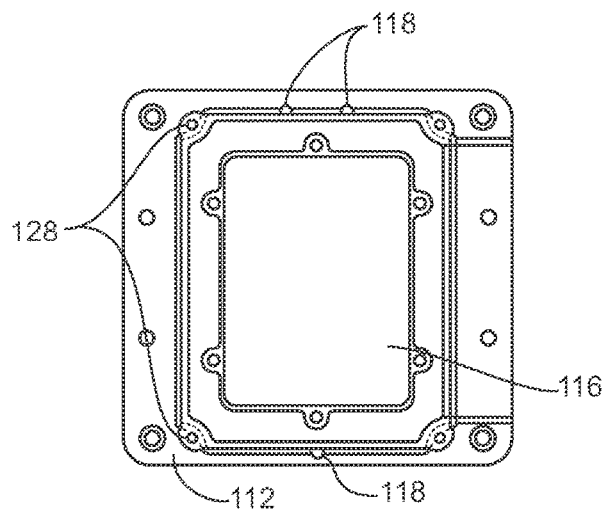
FIG. 10B is a rear view of a first embodiment of a radio tray.
Figure 10C:
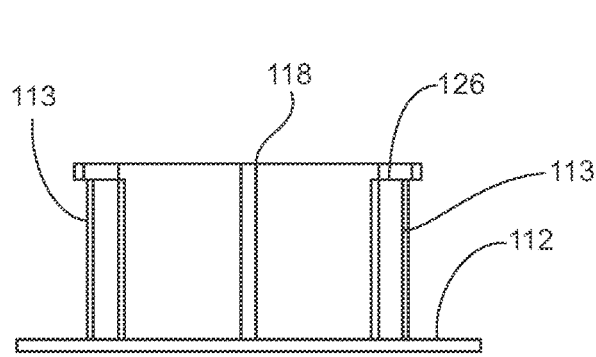
FIG. 10C is a top view of a first embodiment of a radio tray.
Figure 10D:
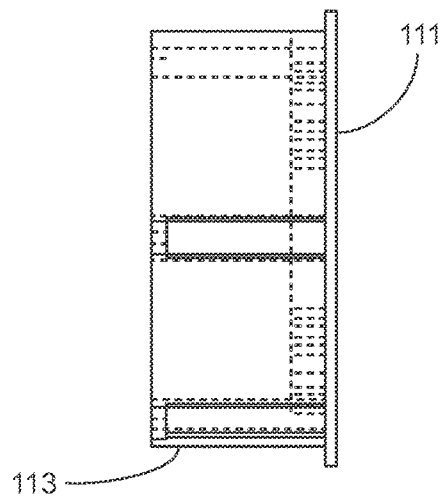
FIG. 10D is a side view of a first embodiment of a radio tray.

Turning to FIG. 3, the universal radio interface includes: (i) an universal interface housing 20; (ii) a radio tray backing 80; (iii) a radio tray 110; and (iv) a radio module 200 partially enclosed by a radio module cover 222. The radio module 200, radio tray 110, and radio tray backing 80 are assembled and secured within an interior cavity 26 of the universal interface housing 20 using one or more threaded fasteners or other mechanical securing means known to those of skill in the art. The universal interface housing 20 is then mounted to a mobile platform, such as the UAV shown in FIGS. 1 and 2. The radio tray 110 includes one or more handles 14 mounted to an exterior face 111 (see FIG. 10A) that are used to grasp and hold the assembly during installation or removal.

The radio tray 110, radio tray backing 80, and universal interface housing 20 each include ports that accommodate a wide array of connectors and cabling configurations that depend on the type of radio and radio manufacturer. The ports allow an installed radio module 200 to connect to subsystems and equipment on the mobile platform, such as a power subsystem, data ports for computing modules, data ports for communication to ground systems through a tether data cable, or the antennas 11 shown in FIGS. 1 and 2.

Radios are replaced by swapping out the radio module 200 itself along with the radio tray 110 and tray backing 80 that are adapted to fit the type of radio module 200 being installed. The radio tray 110 provides a mechanical interface to the universal interface housing 20 and allows different types of radios to be installed within the universal interface housing 20. The radio tray backing 80 protects an interior-facing side of the radio module 200 and accommodates the connector and cable configuration for the type of radio 200 being installed.

The radio module 200, radio tray backing 80, and radio tray 110 are assembled and installed within the universal interface housing 20 that provides a mechanical mount to a mobile platform. The radio module 200 is secured within the radio tray 110 and universal interface housing 20 in a manner that minimizes radio movement or vibration when the mobile platform is in motion to prevent damage to the radio. The radio tray 110 and universal interface housing 20 further protect the radio module 200, connectors, and cabling from weather elements or contaminants and provide physical protection from impacts. One or more of the components can be formed with a corrosion resistant material, such as aluminum or stainless steel, or covered with a corrosion resistant coating to further protect the radio module 200, cabling, connectors, and other hardware.

The universal interface housing 20 embodiment shown in FIGS. 3, 4, and 5A-5D includes a first opening 22 that is partially co-located with, and provides access to, an interior cavity 26. The interior cavity 26 is defined by an opening frame 30, a first sidewall 40, a second sidewall 44, a top mounting surface 50, a bottom surface 54, and a rear sidewall 60. The universal interface housing 20 first sidewall 40 includes a first side access 41, and the second sidewall 44 includes a second side access 45.

The interior cavity 26 includes one or more radio tray guides 28, which are keyed to ensure the radio tray 110 is installed with the correct orientation. The radio tray guides 28 are formed as channels that frictionally engage corresponding teeth 118 formed in the radio tray 110 to facilitate installation and to secure the radio tray 110 within the interior cavity 26 by ensuring the radio tray 110 does not translate about the cross sectional plane of first opening 22.

Figure 14:
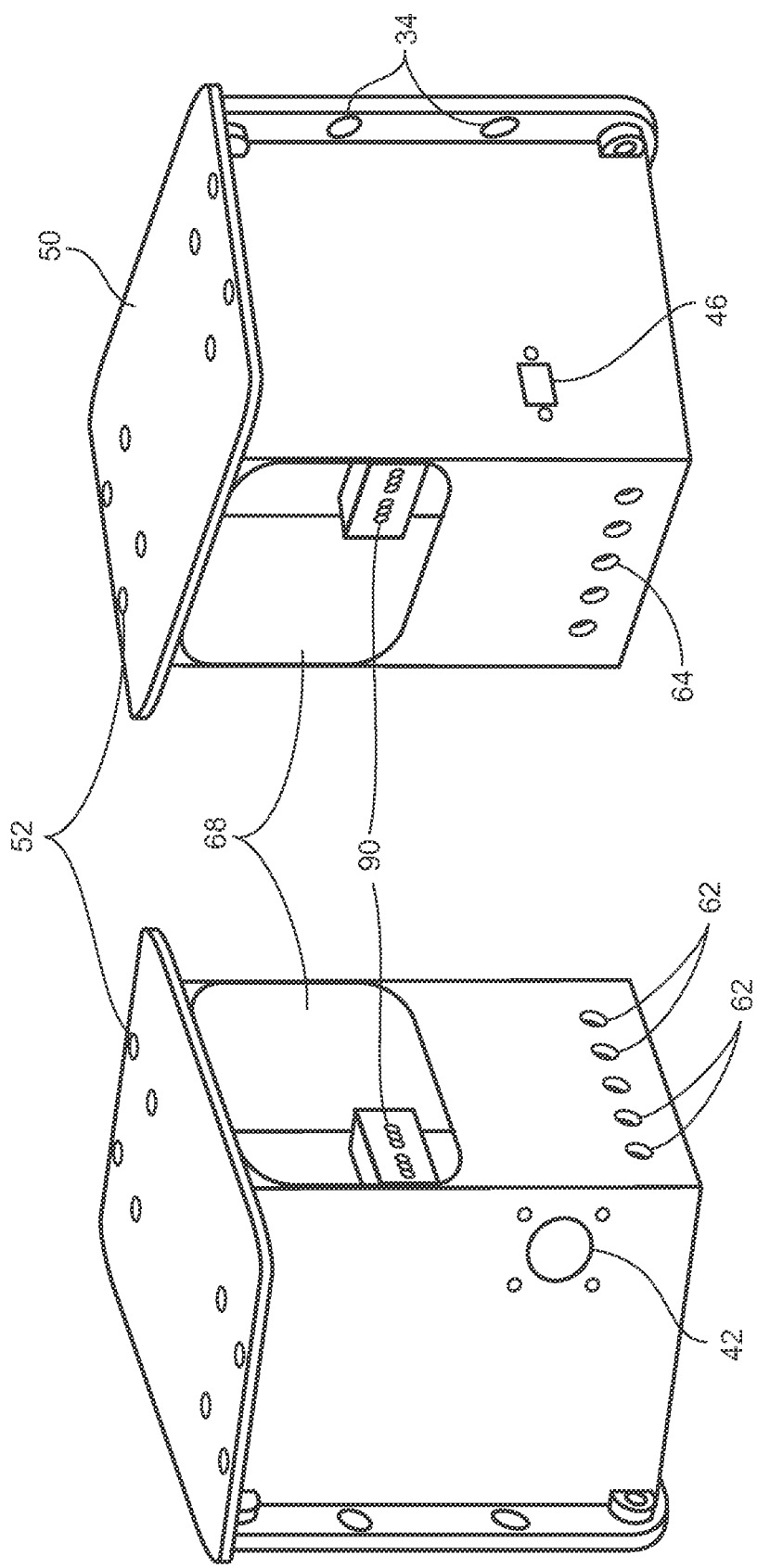
FIG. 14A is a perspective, assembled, first side view of an universal interface housing and radio tray backing according to one embodiment.
FIG. 14B is a perspective, assembled, second side view of an universal interface housing and radio tray backing according to one embodiment.

One or more radio tray securing apertures 32 are disposed on the opening frame 30 to receive fasteners that secure the radio tray 110 to the universal interface housing 20. The opening frame 30 is also formed with one or more handle mounting holes 34 that secure handles 14. Similarly, the top mounting surface 50 includes one or more mounting apertures 52 configured to receive fasteners that are used to secure the universal interface housing 20 to a mobile platform or to secure equipment to the universal interface housing 20 itself, as depicted in FIGS. 1 and 2. The rear sidewall 60 includes a backing tray access 68 that receives a universal backing tray 70, as shown in FIG. 14.

The universal interface housing 20 incorporates one or more ports that extend from an exterior surface of the universal interface housing 20 through to the interior cavity 26. The ports accommodate cables and electrical connectors that place the radio module 200 in signal communication with various subsystems and equipment components on a mobile platform, such as antennas, power sources, or computing modules. Examples of ports include: (i) the Ethernet port 42 disposed through the first side wall 40; (ii) the communications port 46 disposed through the second sidewall 44; (iii) the four antenna guides 62 extending through the rear sidewall 60; and (iv) the power guide 64 also extending through the rear sidewall 60.

Those of skill in the art will appreciate that the ports and port configurations shown in the attached figures are not intended to be limiting. Varying numbers, types, and configurations of ports can be formed through the universal interface housing 20 to accommodate a wide array of mobile platforms, radio types, and radio manufacturers. For instance, additional communications ports 46 may be formed on the first sidewall 40, the top mounting surface 50, or any other sidewall or surface of the universal interface housing 20.

The universal interface housing 20 accommodates different radio modules 200 by replacing the radio tray backing 80 and the radio tray 110 when replacing the radio module 200. The radio tray backing 80 includes ports and openings that are adapted to fit the connector and cabling configuration for one or more types of radio modules 200. The radio tray 110 serves as a mechanical adapter that allows radio modules 200 with different form factors (e.g., varying dimensions, sizes, weights, shapes, etc.) to fit securely within the universal interface housing 20.

Example radio modules 200 are shown in FIGS. 6A-6B and 7A-7B. The first type of radio module 200 shown in FIGS. 1, 2 and 6A-6B by Persistent Systems® fits the radio tray backing 80 and radio tray 110 shown in FIGS. 3 and 10A-10D The first type of radio module 200 includes three antenna connections, draws power of approximately 40 Watts when transmitting and 1.8 Watts when receiving a signal, and transmits over a frequency range of approximately 2200 to 2507 Megahertz ("MHz"). With the heat sinks and covering installed, the first radio module 200 has dimensions of approximately 3.8 inches×2.6 inches×0.5 inches.

Figure 7B:
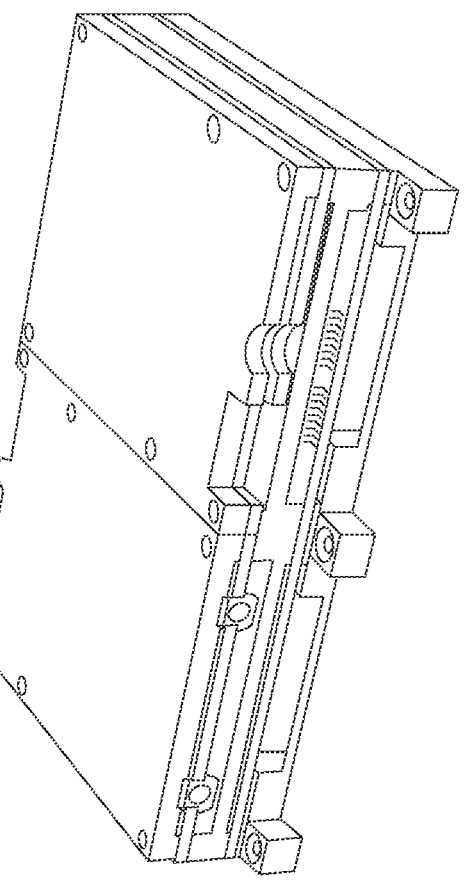
FIG. 7B shows a second side of an example radio module.
Figure 7A:
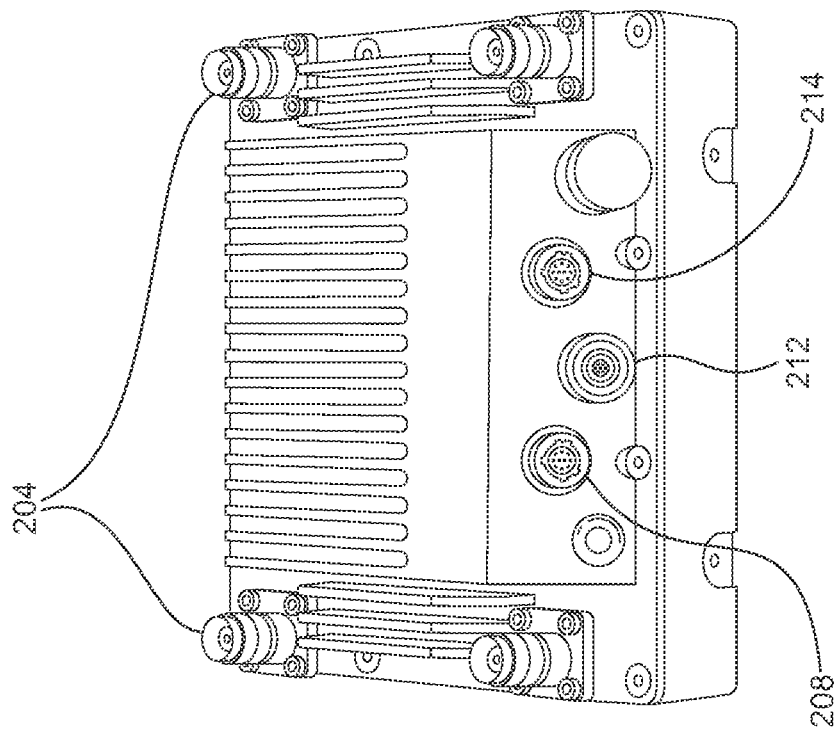
FIG. 7A shows a first side of an example radio module.

The second type of radio module 200 shown in FIGS. 7A-7B by Silvus Technologies® fits the radio tray backing 80 and radio tray 110 shown in FIGS. 8, 11A-11E, and 12A-12B and is assembled with two radio module heat sinks 206 shown in FIG. 8. The second type of radio includes: (i) four antenna connectors 204, (ii) a primary data connector 208 that is ruggedized and can accommodate an Ethernet connector or a RS232 pin connector; (iii) a push-to-talk connector 212, and (iv) an auxiliary connector 214 that is also ruggedized and can accommodate an Ethernet connector or a RS232 pin connector. The second radio module 200 comes in multiple versions or types that can operate over a wide frequency range of 400 MHz to 6 GHz at a transmit power consumption from 8 Watts to 100 Watts. Without the heat sinks and covering, the second radio module 200 has dimensions of approximately 4.3 inches×3.3 inches×0.82 inches.

A first embodiment of a radio tray backing 80 shown in FIGS. 9A & 9B is adapted to fit the connector and cabling configurations for one or more types of radio modules 200. The radio tray backing 80 includes a radio side 84 that faces the radio module 200 when assembled, and a distal side 82 that is opposite the radio module 200. The radio tray backing 80 includes a plurality of antenna ports 90 that can accommodate radios with varying numbers of antenna connectors, such as the first radio module 200 shown in FIGS. 6A-6B having three antenna connectors and the second radio module 200 shown in FIGS. 7A-7B that has four antenna connectors.

The radio tray backing 80 further includes at least one universal connector slot 88 that fits a wide array of radio module 200 connector and cable types, such as Ethernet cables, power cables, or RS232 connectors and cables. Cables connected to the radio module 200 are fed through the universal connector slot(s) 88 and through various ports on the universal interface housing 20 before being connected to a mobile platform.

Figure 12A:
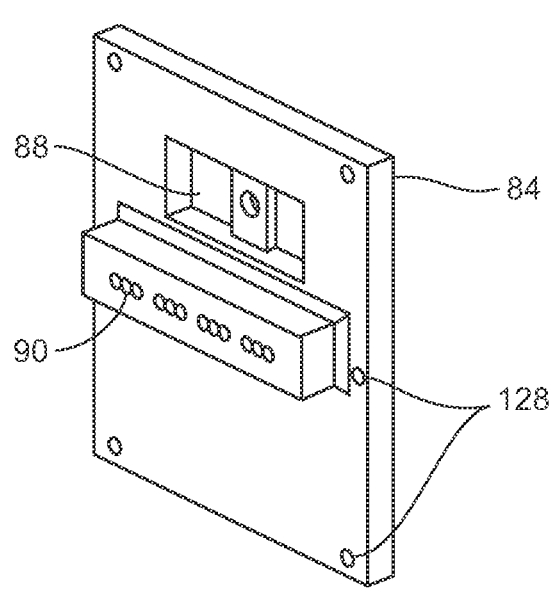
FIG. 12A is an isometric view of a radio tray backing according to a second embodiment.
Figure 12B:
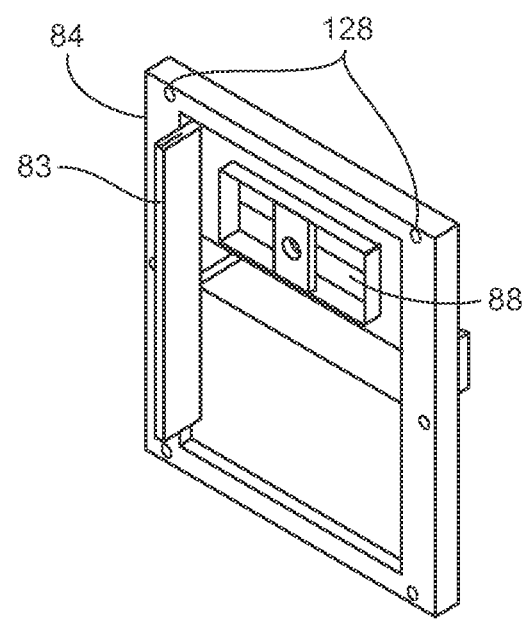
FIG. 12B is an isometric view of a radio tray backing according to a second embodiment.

A second embodiment of a radio tray backing 80 is show in FIGS. 12A-12B and includes an edge blend 83 extending outward from the radio side 84 of the radio tray backing and is adapted to fit the second type of radio by Silvus Technologies®. In general, the radio tray 110 and radio tray backing 80 can include dimensions and features adapted to fit specific types of radio modules 200, such as: (i) variations in the size, spacing, and arrangement of the radio tray backing apertures 128 and radio module apertures 126; (ii) the sizing of the second opening and interior void 114 & 116; or (iii) grooves, channels, protrusions, fins, pins, detents, or voids that correspond or mechanically engage with features of the particular radio module 200 installed.

FIGS. 10A-10D and 12 illustrate details of o radio tray 110. The radio tray 110 defines a second opening 114 that is at least partially co-located with an interior void 116. The interior void 116 is defined by one or more tray casing sidewalls 113 that extend outward from an interior face 112 of the radio tray 110. The second opening 114 and the interior void 116 are sized to accommodate one or more types of radio modules 200 that are secured within the interior void 116 during radio module 200 installation. At the same time, the outer dimensions of the radio tray 110 are sized so that the radio tray 110 fits securely within the interior cavity 26 of the universal interface housing 20.

The radio tray 110 is formed with a variety of apertures and holes that receive fasteners to assemble the system components, including: (i) universal housing apertures 120 that are used to connect the radio tray 110 to the universal interface housing 20; (ii) radio mounting apertures 126 that connect the radio module 200 to the radio tray 110; and (iii) radio tray backing apertures 128 that are used to connect the radio tray 110 to the radio tray backing 80. Teeth 118 formed on the radio tray 110 interior face 112 mate with the radio tray guides 28 during installation to guide the radio tray 110 into the universal interface housing 20 interior cavity 26 and mitigate movement of the radio tray 110 within the interior cavity 26.

Figure 13:
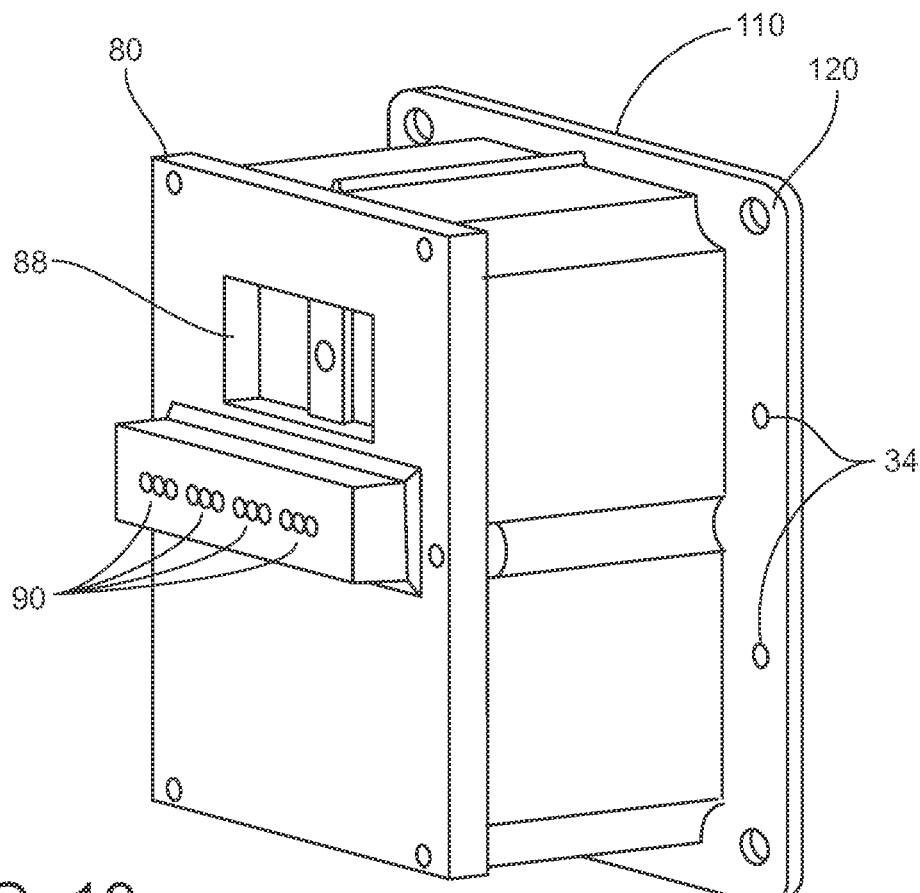
FIG. 13 is a perspective, assembled view of a radio tray and radio tray backing according to one embodiment.
Figure 15:
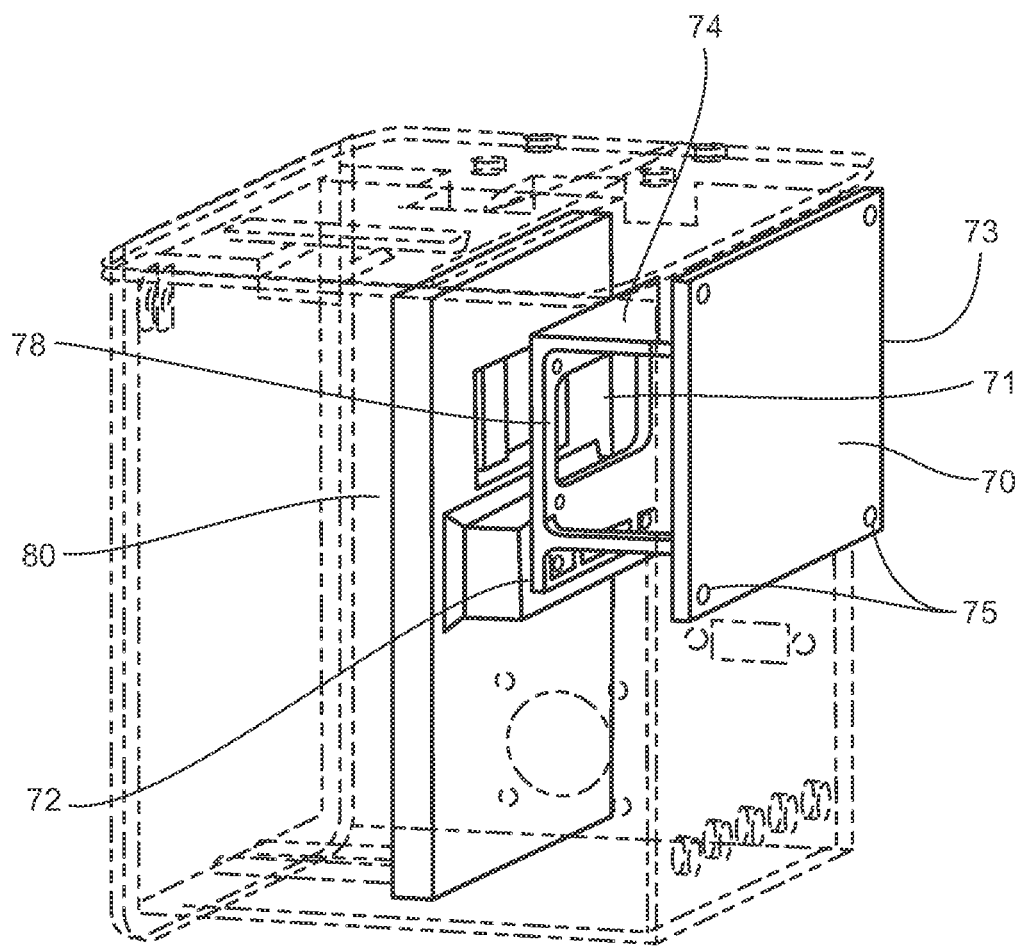
FIG. 15 is a transparent, assembled view of an universal interface housing, radio tray backing, and universal backing tray according to one embodiment.

FIG. 13 illustrates the radio tray backing 80 affixed to the radio tray 110, and FIGS. 14A-14B and 15 show the radio tray backing 80 installed within the universal interface housing 20. When the radio tray backing 80 is installed within the universal interface housing 20, the radio tray backing 80 is proximal to, or frictionally engages, a universal backing tray 70. The universal backing tray 70 can be used to secure the radio tray backing 80 within the interior cavity 26 or mount the universal interface housing 20 to a mobile platform. The universal tray backing 70 includes a mounting plate 73 that faces the mobile platform to be interfaced. One or more universal backing tray mounting apertures 75 are disposed on the mounting plate 73 to receive fasteners that affix the universal interface housing 20 to the universal backing tray 70.

The universal backing tray 70 shown in FIGS. 16A-16DE includes an universal backing tray face 78 and a spacer 74 that places the universal backing tray face 78 a distance apart from the mounting plate 73. A universal connection point 71 and a plurality of antenna connection points 72 extend through the universal backing tray face 78. When assembled, the universal backing tray face 78 and spacer 74 are inserted through the backing tray access 68 such that the antenna connection points 72 are proximal to, or frictionally engage, the antenna ports 90 on the radio tray backing 80, and the universal connection point 71 is aligned with the universal connector slot 88.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A method for installing a radio module comprising the steps of:
    (a) mounting an universal interface housing to a communication platform, wherein the universal interface housing comprises an interior cavity, one or more guide ports that extend from an exterior of the universal interface housing to the interior cavity, one or more radio tray guides, and a mounting surface coupled to the communication platform;
    (b) coupling a first radio module to a radio tray, wherein the radio tray comprises an exterior face, an interior face, one or more teeth formed on the interior face, a tray opening extending between the exterior face and the interior face, and one or more tray casing sidewalls extending outward from the interior face, wherein
        (i) the first radio module comprises electronics for transmitting or receiving wireless signals,
        (ii) the one or more teeth are sized to fit within the one or more radio tray guides,
        (iii) the one or more teeth are positioned on the interior face in a manner that the one or more teeth each align with the one or more radio tray guides when the radio tray is coupled to the universal interface housing,
        (iv) the tray casing sidewalls define an interior void,
        (v) the tray opening and the interior void are sized to accommodate the first radio module, and
        (vi) the first radio module is coupled to the radio tray and seated at least partially within the tray opening and interior void;
    (c) coupling a first radio tray backing to the tray casing sidewalls, wherein the first radio tray backing comprises a first radio opening sized to fit the first radio module and comprises an antenna port; and
    (d) coupling the radio tray to the universal interface housing, wherein the radio tray and the tray casing sidewalls are seated at least partially within the interior cavity;
    (e) de-coupling the radio tray from the universal interface housing;
    (f) coupling a second radio module to a second radio tray, wherein (i) the second radio module has physical dimensions that are different than the first radio module, (ii) the second radio tray comprises a second interior face with at least one tooth sized to fit within at least one of the radio tray guides, and (iii) the at least one tooth is positioned on the second interior face in a manner that the at least one tooth aligns with at least one of the radio tray guides when the radio tray is coupled to the universal interface housing;

(g) coupling a second radio tray backing to the second radio tray, wherein the second radio tray backing comprises (i) an outward face and an inward face, (ii) a second radio opening sized to fit the second radio module, and at least one antenna port; and (h) coupling the second radio tray to the universal interface housing, wherein the second radio tray is seated at least partially within the interior cavity.

2. The method for installing a radio module of claim 1, wherein the second radio tray backing includes a coupling feature adapted to frictionally engage a corresponding attachment feature of the second radio module, wherein the coupling feature is selected from one of an edge blend extending outward from the interior face, a grove, a channel, a detent, a protrusion, a fin, a pin, or void.

* * * * *